(12) United States Patent
Duquette et al.

(10) Patent No.: US 11,371,481 B2
(45) Date of Patent: Jun. 28, 2022

(54) HYDROKINETIC ENERGY DEVICE

(71) Applicant: LITTORAL POWER SYSTEMS, INC., Fall River, MA (US)

(72) Inventors: David J. Duquette, Fairhaven, MA (US); Kimbal Anderson Hall, Princeton, MA (US)

(73) Assignee: LITTORAL POWER SYSTEMS, INC., New Bedford, MA (US)

( * ) Notice: Subject to any disclaimer, the term of this patent is extended or adjusted under 35 U.S.C. 154(b) by 0 days.

(21) Appl. No.: 16/566,503

(22) Filed: Sep. 10, 2019

(65) Prior Publication Data
US 2020/0088158 A1    Mar. 19, 2020

Related U.S. Application Data

(60) Provisional application No. 62/729,668, filed on Sep. 11, 2018.

(51) Int. Cl.
| | | |
|---|---|---|
| *F03B 17/06* | (2006.01) | |
| *F03B 13/26* | (2006.01) | |
| *F03B 13/10* | (2006.01) | |
| *F03D 1/06* | (2006.01) | |

(52) U.S. Cl.
CPC .......... *F03B 17/061* (2013.01); *F03B 13/264* (2013.01); *F03B 13/10* (2013.01); *F03D 1/0675* (2013.01); *F05B 2240/30* (2013.01); *F05B 2240/40* (2013.01); *F05B 2240/93* (2013.01); *F05B 2240/97* (2013.01)

(58) Field of Classification Search
CPC ...... F03B 17/061; F03B 13/264; F03B 13/10; F03D 1/0675; F05B 2240/30; F05B 2240/40; F05B 2240/93; F05B 2240/97
See application file for complete search history.

(56) References Cited

U.S. PATENT DOCUMENTS

| | | | | |
|---|---|---|---|---|
| 2,501,696 | A * | 3/1950 | Souczek | F03B 17/061 |
| | | | | 290/43 |
| 3,209,156 | A * | 9/1965 | Struble, Jr. | H02K 7/1823 |
| | | | | 290/54 |
| 4,917,332 | A | 4/1990 | Patterson, Jr. | |
| 6,263,971 | B1 * | 7/2001 | Giannesini | E21B 43/017 |
| | | | | 166/366 |
| 7,270,214 | B1 * | 9/2007 | Tonnessen | G01V 1/3826 |
| | | | | 114/244 |
| 7,737,570 | B2 * | 6/2010 | Costin | F03B 17/061 |
| | | | | 290/43 |
| 8,421,260 | B2 | 4/2013 | Duke | |
| 9,440,718 | B1 * | 9/2016 | Tang | F42B 19/00 |
| 9,709,024 | B2 | 7/2017 | Duke | |

(Continued)

*Primary Examiner* — Sean Gugger
(74) *Attorney, Agent, or Firm* — Adler Pollock & Sheehan P.C.

(57) ABSTRACT

Systems and method for a hydrokinetic energy device. A hydrokinetic energy device includes a main body including two main wing-shaped spars mounted upon a rotating central hub, and rotatable spar tip turbines mounted at or near an end of each of the main wing-shaped spars, the main wing-shaped spars driving the rotatable spar tip turbines through water, each of the rotatable spar tip turbines including a direct-drive generator and power conversion system that transfers power from a rotating rotatable spar tip turbine to the central hub where the voltage is stepped up and amperage is reduced.

11 Claims, 5 Drawing Sheets

(56) References Cited

U.S. PATENT DOCUMENTS

| | | | |
|---|---|---|---|
| 10,518,595 B2* | 12/2019 | Dietrich | B60F 5/02 |
| 2007/0241566 A1* | 10/2007 | Kuehnle | F03B 17/061 |
| | | | 290/53 |
| 2009/0196748 A1* | 8/2009 | Salter | F03D 80/50 |
| | | | 416/120 |
| 2009/0230686 A1* | 9/2009 | Catlin | F03B 17/061 |
| | | | 290/54 |
| 2010/0181774 A1* | 7/2010 | Dehlsen | B63B 21/50 |
| | | | 290/54 |
| 2011/0095530 A1* | 4/2011 | Blumer | F03B 17/061 |
| | | | 290/43 |
| 2012/0292911 A1* | 11/2012 | Bolin | F03B 17/061 |
| | | | 290/54 |
| 2014/0308111 A1* | 10/2014 | Duke | F03B 17/061 |
| | | | 415/7 |
| 2016/0027308 A1* | 1/2016 | Hine | F03B 13/10 |
| | | | 701/21 |
| 2016/0138554 A1* | 5/2016 | Hawthorne | F03B 17/02 |
| | | | 416/84 |
| 2019/0040840 A1* | 2/2019 | Rohrer | F03B 13/182 |
| 2020/0088157 A1* | 3/2020 | Meason | F03B 13/264 |

* cited by examiner

One per tip-turbine  One per rotary transformer (RX)  One per tether

HYDROKINETIC ENERGY DEVICE

CROSS-REFERENCE TO RELATED APPLICATIONS

This application claims benefit from U.S. Provisional Patent Application Ser. No. 62/729,668, filed Sep. 11, 2018, which is incorporated by reference in its entirety.

BACKGROUND OF THE INVENTION

The invention generally relates energy devices, and more specifically to a hydrokinetic energy device.

In general, hydrokinetic devices are powered by moving water and are different from traditional hydropower turbines in that they are placed directly in a river, ocean or tidal current. They generate power mainly from the kinetic energy of moving water (current). This power is a function of the density of the water and the speed of the current cubed. The available hydrokinetic power depends on the speed of the river, ocean, or tidal current. In order to operate, hydrokinetic devices require a minimum current and water depth. As water flows through a turbine or other device, the kinetic energy of the flowing river, tidal fluctuations, or waves is converted into electricity by the device.

The minimum current required to operate a hydrokinetic device is typically 2-4 knots. Optimum currents are in the 5-7 knot range. Water depth is an important factor in the total energy that can be extracted from a site, since rotor diameter is dependent on adequate water level above and below the installed device. Hydrokinetic devices are ideally installed in locations with relatively steady flow throughout the year, locations not prone to serious flood events, turbulence, or extended periods of low water level.

BRIEF SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a hydrokinetic energy device including a main body including two main wing-shaped spars mounted upon a rotating central hub, and rotatable spar tip turbines mounted at or near an end of each of the main wing-shaped spars, the main wing-shaped spars driving the rotatable spar tip turbines through water, each of the rotatable spar tip turbines including a direct-drive generator and power conversion system that transfers power from a rotating rotatable spar tip turbine to the central hub where the voltage is stepped up and amperage is reduced.

In another aspect, the invention features a method including providing a hydrokinetic energy device, the hydrokinetic energy device including a main body having a tether and two main wing-shaped spars mounted upon a rotating central hub, and rotatable spar tip turbines mounted at or near an end of each of the main wing-shaped spars, the main wing-shaped spars driving the rotatable spar tip turbines through water, each of the rotatable spar tip turbines including a direct-drive generator and power conversion system that transfers power from a rotating rotatable spar tip turbine to the central hub where the voltage is stepped up and amperage is reduced, attaching an anchor to the tether, dropping the anchor into a body of water, and floating the tether in a water column with a submersed buoy.

In still another aspect, the invention features a method including providing a hydrokinetic energy device, the hydrokinetic energy device including a main body having two main wing-shaped spars mounted upon a rotating central hub, and rotatable spar tip turbines mounted at or near an end of each of the main wing-shaped spars, the main wing-shaped spars driving the rotatable spar tip turbines through water, each of the rotatable spar tip turbines including a direct-drive generator and power conversion system that transfers power from a rotating rotatable spar tip turbine to the central hub where the voltage is stepped up and amperage is reduced, providing an unmanned underwater vehicle, linking the hydrokinetic energy device to the unmanned underwater vehicle, and deploying the hydrokinetic energy device.

Embodiments of the invention may have one or more of the following advantages.

The system of the present invention produces meaningful power even in marginal current velocities.

The system of the present invention can be installed and maintained safely and cost effectively while having little impact on navigation through the use of self deploying devices.

Turbine assemblies of the present invention are attached to a single point mooring line and anchor that can reduce deployment costs and interference with surface navigation, as compared to traditional approaches requiring structural pilings or bedrock mounted frames and maintenance via on station surface vessels.

The system of the present invention and its components address the nascent marine hydrokinetic energy industry's cost-reduction needs and reduces barriers to deployment with technology rather than relying on long, drawn-out policy changes or hoped for easing of hydropower regulations.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE INVENTION

Figure 1:
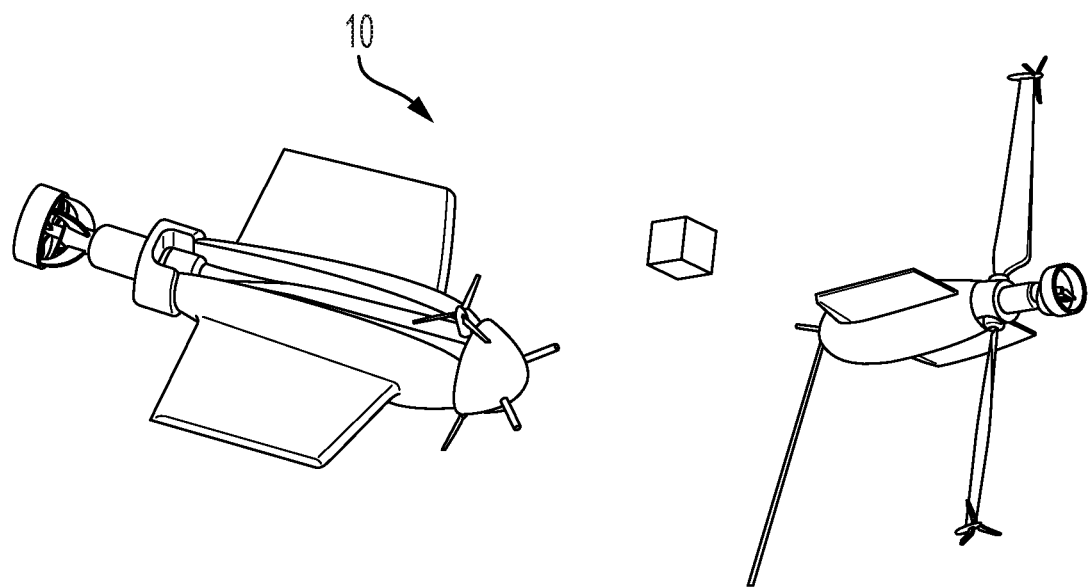
FIG. 1 is an illustration of an exemplary hydrokinetic energy device.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As shown in FIG. 1, an exemplary hydrokinetic energy device 10 of the present invention (with wing-shaped spars folded (left), with wing-shaped spars deployed (right)) features a turbine with capability to harness significant power from the moderate flows; a characteristics of most of the water resources within the United States. The hydrokinetic energy device 10 can be manually deployed and tethered, but is more likely to be used in semi-autonomous or remote operated mode to avoid having a vessel in a navigation channel. For this same reason, the hydrokinetic energy device 10 includes an anchored tether for the mooring and electrical cable that can be quickly dropped in place off a barge.

The hydrokinetic energy device 10 folds into a streamlined body. Its ballast tanks are flooded to provide neutral buoyancy and the hydrokinetic energy device 10 is launched from shore, or from a vessel position alongside the navigable channel. The hydrokinetic energy device 10 swims out to a specified mooring tether, using electric propeller drive machinery. The hydrokinetic energy device 10 trails a surface communication pack. The hydrokinetic energy device 10 uses acoustics to home in on its tether. With its streamlined shape one can estimate that the hydrokinetic energy device 10 can swim a quarter mile in a 6 knot current with enough on board battery power to last 30 minutes. Thus, the hydrokinetic energy device 10 is for a semi-autonomous central nacelle that can transport and deploy itself onto a power head of a free-flying submerged tether, obviating human intervention.

Tethers are floated up in the water column by submersible buoys. An upper end of the tether is attached to a structural and electrical coupling for the hydrokinetic energy device 10. As the hydrokinetic energy device 10 swims in, it catches its tether using a whisker wire and makes its mechanical connection by sliding up to the top of the tether wire.

The hydrokinetic energy device 10 is designed to achieve commercially attractive leveled cost of energy (LCOE) in slow-moving currents with a three-pronged approach:

1. The hydrokinetic energy device 10 trades swept area for velocity to take advantage of the fact that in a lift device, developed power varies as a cubic function of velocity and only as a linear function of swept area. In the hydrokinetic energy device 10, very low-cost, lightweight, direct-drive generators and turbines are placed at or near the ends of driving wing-shaped spars that drive them through the water at up to six times faster than the free stream velocity.

2. The small inexpensive wing-shaped spar-rotatable spar tip turbines are placed downstream of the driving wing-shaped spar tip such that the driving wing-shaped spar's shed wingtip vortex, i.e., a significant swirl created at the end of the blades, enhances the power generation. The spar tip turbines may be placed on the end of the spars, however the spar tip vortices rotate really fast and unpredictably at the core of the vortex and not as fast and are more predictable and uniform farther away from the core so positioning the spar tip turbines somewhat below the end of the spar tips or making the hub of the spar tip turbines sufficiently large will condition the vortex so it effectively interacts with the blades of the spar tip turbines. Another reason for an embodiment that positions the tip turbines below the end of the spar tips is to hide the tip turbine blades behind the main spars to minimize interaction with fish. Shrouding the tip turbine blades is another design approach to minimize fish interactions.

3. The configuration results in near zero net torque about the central axis of the hydrokinetic energy device 10. This gives rise to multiple benefits, among them that (i) the driving wing-shaped spars can begin turning at very low velocities, and (ii) the device can be secured with simple low-cost moorings.

Figure 2:
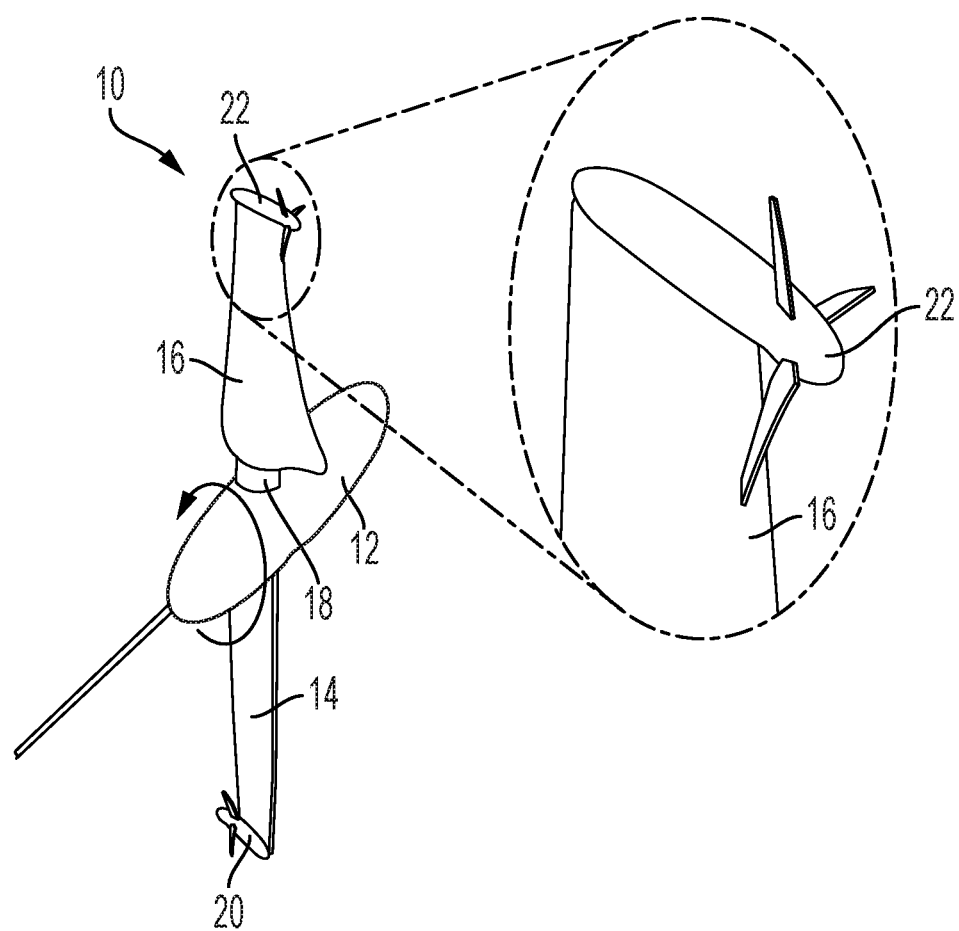
FIG. 2 is another illustration of the exemplary hydrokinetic energy device.

As shown in FIG. 2, the hydrokinetic energy device 10 includes a main body 12 with two main wing-shaped spars 14, 16 mounted upon a rotating center hub 18, with two rotatable spar tip turbines 20, 22 mounted at or near an end of each wing-shaped spar 14, 16, respectively. The main wing-shaped spars 14, 16 drive the rotatable spar tip turbines 20, 22 through the water but do not directly produce electrical power. Electrical power is taken out of the rotatable spar tip turbine rotors 20, 22 through a direct-drive generator (not shown), transported through cables and a power conversion system running inside the main wing-shaped spars 14, 16, and is passed across the central hub 18 using a transformer (not shown). Electricity needs to be transported across a moving (rotating) interface that rotates with very little torque to get the electricity from the device into cables that carry it to shore. Slip rings can be used to transmit the electrical power across the rotation at the center of the hub of the driving spars, but a rotating transformer is more eloquent since no further downstream transformers are needed. Voltage is stepped up right in the hydrokinetic energy device 10, amperage is reduced, and no further "downstream" transformers are needed, saving on the cost of power cables.

Figure 3:
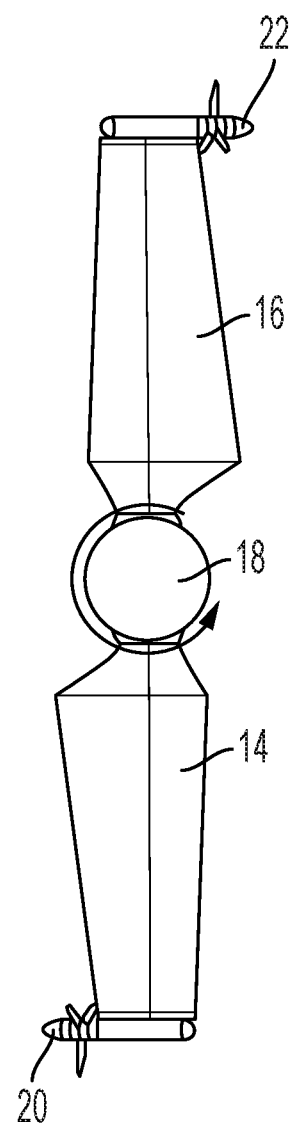
FIG. 3 is an illustration of a front view of the two main wing-shaped spars mounted upon the rotating center hub with two rotatable spar tip turbines.

In FIG. 3, a front view illustrates the two main wing-shaped spars 14, 16 mounted upon the rotating center hub 18, with two rotatable spar tip turbines 20, 22 mounted at or near an end of each wing-shaped spars 14, 16, respectively.

Figure 4:
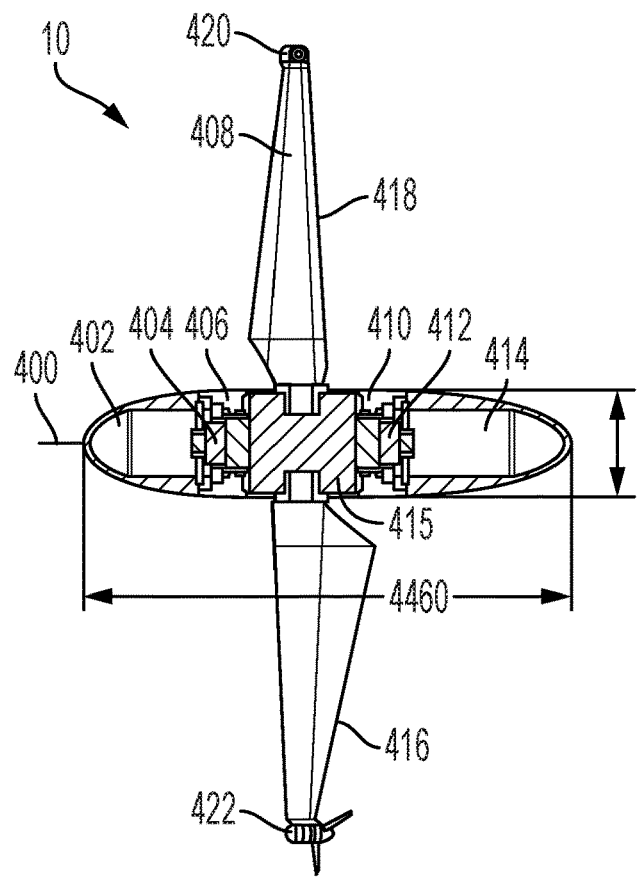
FIG. 4 is an illustration of a top view of the hydrokinetic energy device.

In FIG. 4, a top view of the hydrokinetic energy device 10 is illustrated and includes a tether 400, a front nacelle 402, a sealing system 404, a front casing 406 and first wing-shaped spar 408. The hydrokinetic energy device 10 includes a rear casing 410, a bearing 412, a rear nacelle 414, a hub 415 and a second wing-shaped spar 416. The first wing-shaped spar 408 is generally constructed from a composite material and includes an electrical connection 418 to a first rotatable spar tip turbine 420. The second wing-shaped spar 416 also includes an electrical connection (not shown) to a second rotatable spar tip turbine 422.

Figure 5:
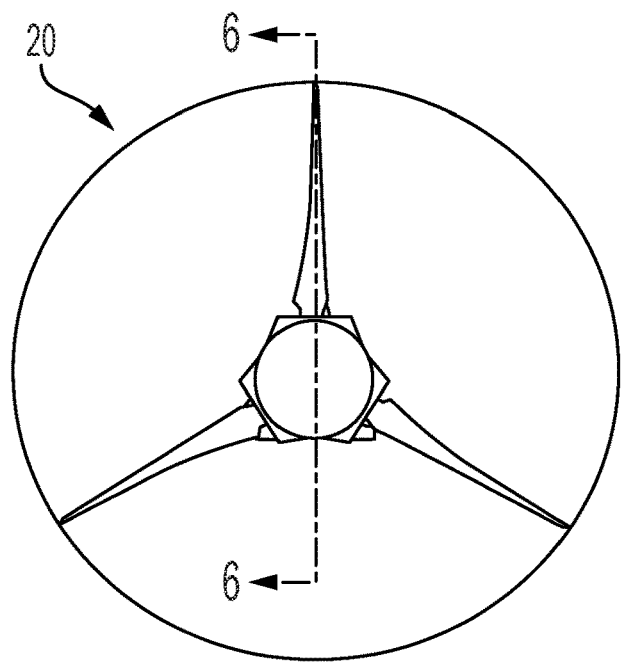
FIG. 5 is an illustration of a front view of the rotatable spar tip turbine.

In FIG. 5, a front view of the rotatable spar tip turbine 20 is illustrated.

Figure 6:
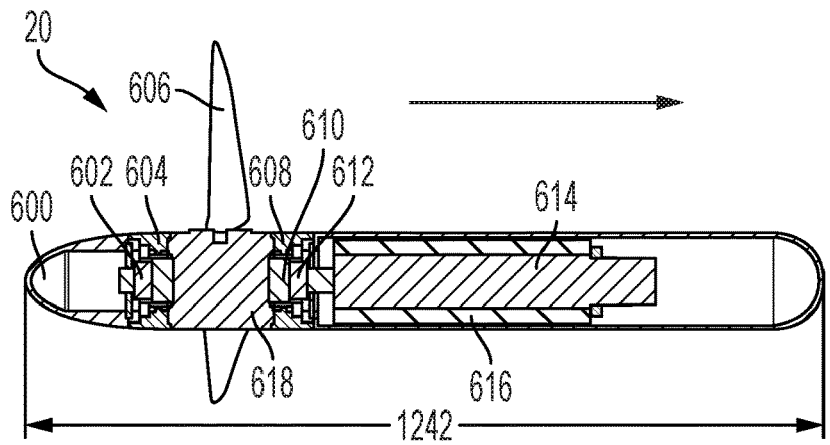
FIG. 6 illustrates a cross-sectional view of the rotatable spar tip turbine.

In FIG. 6, a cross-sectional view of the rotatable spar tip turbine 20 is illustrated and includes a rear nacelle 600, a sealing system 602, a rear casing 604, a three-bladed propeller 606, a front casing 608, a bearing 610, a braking system 612, a front nacelle 614, a generator 616 and a hub 618. A braking system is required to keep the turbine from spinning during deployment and maintenance. In typical axial turbine configurations that are attached to rigid supports, the support is able to counteract the torque from the turbine to keep it from spinning. However, the low-torque mooring system prevents such a technique from being used for this device. Instead, the hydrodynamic torque from the wing-shaped spars must be neutralized to prevent the turbine from spinning. Torque-neutralization can be accomplished in a number of ways, including: pitch control of the blades, where the entire blade feathers into the current; rotating the outer portion of the blades while maintaining the pitch of the blade root; folding the blades either upstream or downstream so that the axis of the blades is aligned with the direction of the current; or slowing the turbine by opening a flow passage from the root of the spar to the tip of the spar that would centrifugally pump water from the root to the tip when the blade is spinning, thereby slowing the turbine's rotational speed. The latter method would be used only to slow the turbine so that it might be brought up to the surface, and having the turbine lay on the surface would prevent rotation. Several of these braking techniques can also be used to prevent over-speed during times when power output is too high, or current speeds are high enough that they may cause damage to the device if it were to continue with normal operation.

Figure 7A:
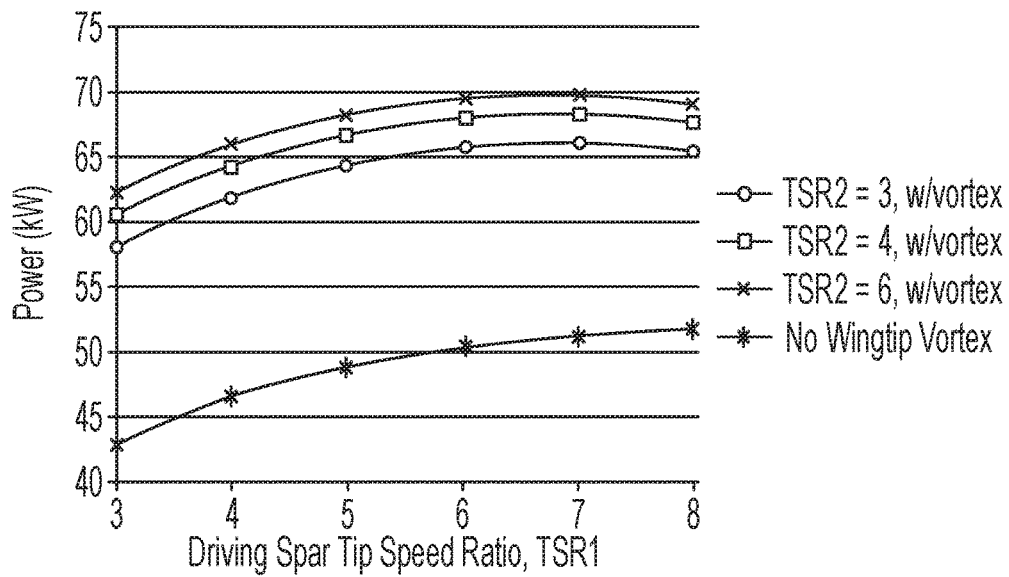
FIG. 7A is a graph.

In FIG. 7A, a graph 300 illustrates mechanical power produced by a 7.75 m turbine in a 4 knot current as a function of the tip speed ratio for the driving wing-shaped spars and the tip speed ratio of the rotatable spar tip turbine rotors, with and without an effect of the vortex.

Figure 7B:
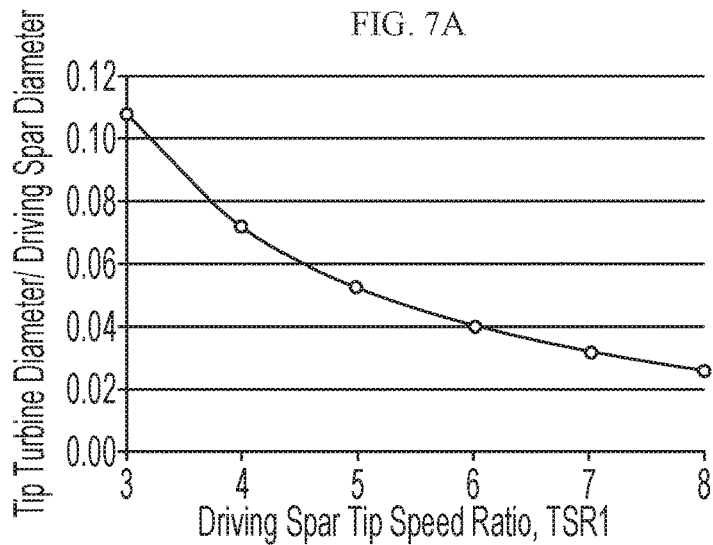
FIG. 7B is another graph.

In FIG. 7B, a graph 310 illustrates the optimal size of the rotatable spar tip turbine decreases as the driving wing-shaped spar tip speed ratio increases.

The graphs 300 and 310 show that by placing the rotatable spar tip turbines immediately downstream of the end of the driving wing-shaped spars in order to capture additional energy from the wingtip shed vortices, the turbine power output can be increased by approximately 40% compared with placing the turbines in undisturbed flow at the leading edge of the main rotor.

Figure 8:
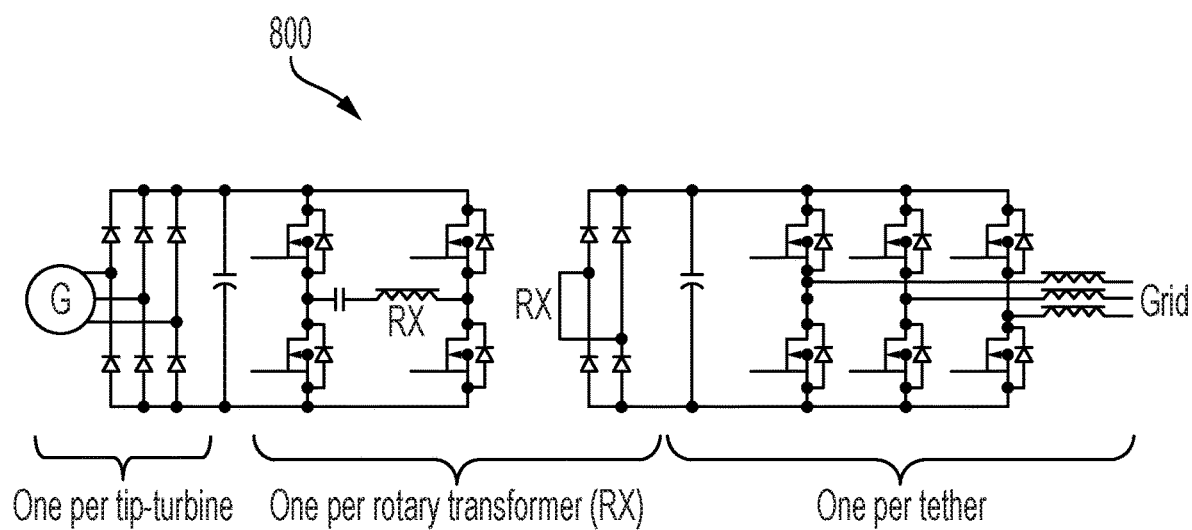
FIG. 8 illustrates an exemplary baseline electrical system for the hydrokinetic energy device.

In FIG. 8, an exemplary baseline electrical system 800 for the hydrokinetic energy device 10 is shown. A bridge converter excites the primary of the rotating transformer. The secondary of the rotating transformer feeds an uncontrolled rectifier, delivering energy to a second DC bus. Energy delivered to the second DC bus is inverted into the AC grid. There are at least three possible places to combine the outputs of the generators: (i) the first DC bus; (ii) the second DC bus; and (iii) the grid itself.

Converter topology decisions are made in the context of supporting turbine operation and control at all times while trying to minimize LCOE. For example, using a fully-controlled inverter to interface the generator to the first DC bus allows full control over generator phase currents. This topology improves generator efficiency and power factor, but perhaps more importantly enables the rotatable spar tip turbines to be differentially loaded. This is highly valuable for overall turbine operation, particularly in shallow water, and justifies possible additional cost and complexity.

It is anticipated the power conversion system from the generator through the primary of the rotating transformer will be packaged within the driving wing-shaped spars to take advantage of the significant surface area available for heat rejection. The electrical conversion system is encapsulated from the generator stator windings through the grid converter. The secondaries of the rotating transformers and grid interface converter are packaged within the tethered nacelle of the turbine.

The generator is a permanent magnet machine with high pole count. For a rotatable spar tip turbine rotational speed of 625 rpm for a 0.75 m diameter rotatable spar tip turbine, the fundamental electrical frequency generated is 5.208 $N_p$, where $N_p$ is the number of poles in the generator. Targeting a fundamental frequency of approximately 200 Hz, $N_p$ is in the range of 38. A fundamental frequency of 200 Hz for a three-phase generator when rectified converts to a fundamental ripple frequency of 1200 Hz at the DC bus, keeping the filtering requirements quite modest. The high pole count keeps the flux per pole low, requiring thin back iron in the stator and making the generator rim-like in nature, suitable for packaging within a shroud that protects the turbine. The baseline generator has the stator on the inside and is a radial field configuration. Generator power density is aided through immersion in water.

The rotary transformer uses radial or axial magnetic fields. The high- and low-voltage windings rotate relative to one another without changing the magnetic circuit; hence, power transfer is independent of relative rotational motion. While there are design challenges, the rotating transformer represents a robust, low-maintenance component with high reliability and modest cost, a significant alternative to traditional slip rings. Further, the turns ratio of the rotating transformer provides a degree of freedom in optimizing the electrical system design.

The design of the hydrokinetic energy device 10 gives rise to a number of simple, inexpensive deployment techniques. More specifically, the hydrokinetic energy device 10 can be quickly and easily deployed with a variety of mooring systems depending on the site characteristics. There are two principal reasons for this ease of deployment. First, the lack of any appreciable torque reaction about the central axis of the hydrokinetic energy device 10 permits mooring on a single tether as no or minimal rotational force needs to be resisted in order to hold it on station. Second, the hydrokinetic energy device 10 is compact and lightweight; as such, only a simple inexpensive work boat or barge with a small crane is required for deployment and retrieval as there is little danger of capsizing when the hydrokinetic energy device 10 is lowered over the side. This approach obviates the need for a specialized, expensive-to-charter ship containing a "moon pool." With added buoyancy and/or lifting winglets, the hydrokinetic energy device 10 can be floated up into the highest-current-velocity region of the water column.

Rapid deployment is critical in utility-scale projects that are deployed underneath surface traffic. In these cases, deploying the hydrokinetic energy device 10 starts with using a gravity base and/or anchor to which is attached a tether containing an electrical cable that can be quickly dropped in place off a barge. A single electromechanical cable for load bearing as well as power/data transmission is a commercially available off-the-shelf (COTS) part. The tether is floated up in the water column via a submersed buoy, onto which the hydrokinetic energy device 10 is mechanically and electrically connected.

Figure 9:
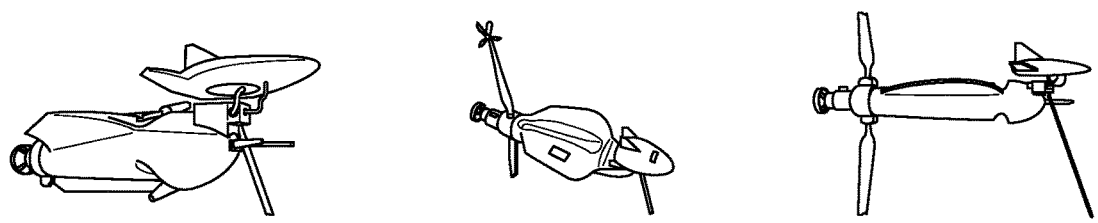
FIG. 9 illustrates an exemplary an unmanned underwater vehicle (UUV) deployment of a hydrokinetic energy device.

As shown in FIG. 9, the hydrokinetic energy device 10 can be part of an unmanned underwater vehicle (UUV) deployment, whether remote, semi-autonomous or autonomous, to solve the key problem of access in heavily navigated waterways. Many of the more favorable incurrent hydrokinetic sites are found underneath navigation channels, because currents tend to run fastest in deepwater channels. For example, the lower Mississippi River offers the opportunity to sweep large areas of low-to-medium-velocity current and is near ample power distribution resources on shore. However, surface traffic is extremely busy in this area: over 200 vessels of 300' or greater in overall length transit New Orleans daily. As such, the navigation channel must be kept open at all times.

In one UUV deployment scenario, the hydrokinetic energy device 10 folds into a streamlined body with wings. The hydrokinetic energy device 10 is launched from a vessel positioned alongside the navigable channel. The hydrokinetic energy device 10 "swims" out to a specified mooring tether, using electric propeller drive machinery. The hydrokinetic energy device 10 trails a surface communication pack to provide radio communication and coarse navigation capabilities. To finally locate its tether, the hydrokinetic energy device 10 uses acoustic homing. As the hydrokinetic energy device 10 navigates to its designated power head, it catches the tether using a whisker wire and continues to swim over-center, and makes its mechanical connection as it slides up to the top of the tether wire. The electrical connection to the turbine is made with connectors as are commonly used to recharge many common UUVs.

Although FIG. 9 shows the UUV integral to one hydrokinetic energy device 10, in other implementations the UUV can be detachable so that it may deploy/serve multiple hydrokinetic energy devices for lower capital costs.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed:

1. A method comprising:
    providing a hydrokinetic energy device, the hydrokinetic energy device comprising a main body having at least one main foldable wing-shaped spar mounted upon a rotating central hub, the wing-shaped spar being substantially received within the main body when in a foldable configuration, and a rotatable spar tip turbine mounted at or near an end of the at least one main wing-shaped spar, the at least one main wing-shaped spar driving the rotatable spar tip turbine through water, the rotatable spar tip turbine including a direct-drive generator and power conversion system that transfers power from the rotating rotatable spar tip turbine to the central hub where a voltage is stepped up and amperage is reduced;
    floating an electromechanical tether cable via a submerged buoy;
    providing an unmanned underwater vehicle;
    linking the hydrokinetic energy device to the unmanned underwater vehicle; and
    deploying the hydrokinetic energy device by catching the tether cable, sliding up the tether cable, and making a mechanical and electrical connection to the tether cable.

2. The method of claim 1 wherein the main body further comprises:
    a tether;
    a front nacelle;
    a braking system to slow the rotatable spar tip turbine when brought to a water surface and to prevent overspeed during times when power output is too high;
    a sealing system; and
    a front casing.

3. The method of claim 1 wherein the tether cable is configured for mooring, and for housing an electrical cable.

4. The method of claim 2 wherein the main body further comprises:
    a rear casing;
    a bearing; and
    a rear nacelle.

5. The method of claim 4 wherein the rotatable spar tip turbine comprises:
    a rear nacelle;
    a sealing system;
    a rear casing;
    a three-bladed propeller;
    a front casing;
    a bearing; and
    a front nacelle.

6. The method of claim 1 wherein the wing-shaped spar is constructed from a composite material.

7. The method of claim 1 wherein the main body further comprises:
    a front nacelle;
    a sealing system;
    a front casing;
    a rear casing;
    a bearing; and
    a rear nacelle; and
    wherein the rotatable spar tip turbine comprises:
    a direct-drive generator that transfers power from the rotating rotatable spar tip turbine to the central hub where a voltage is stepped up and an amperage is reduced;
    a rear nacelle;
    a sealing system;
    a rear casing;
    a three-bladed propeller;
    a front casing;
    a bearing;
    a braking system to slow the rotatable spar tip turbine when brought to a water surface and to prevent overspeed during times when power output is too high; and
    a front nacelle.

8. The method of claim 7 wherein the wing-shaped spar is constructed from a composite material.

9. The method of claim 1 further comprising:
    attaching an anchor to the tether cable;
    dropping the anchor into a body of water; and
    wherein the tether floats in a water column in the body of water.

10. The method of claim 1 wherein the tether cable comprises a single electromechanical cable for load bearing and power/data transmission.

11. The method of claim 1 wherein the unmanned underwater vehicle comprises a surface communication pack to provide radio communication and course navigation capabilities.

* * * * *